United States Patent
Bullman et al.

(10) Patent No.: US 7,725,663 B2
(45) Date of Patent: May 25, 2010

(54) MEMORY PROTECTION SYSTEM AND METHOD

(75) Inventors: William R. Bullman, Macungie, PA (US); Scott McCurdy, Whitehall, PA (US)

(73) Assignee: Agere Systems Inc., Allentown, PA (US)

(*) Notice: Subject to any disclaimer, the term of this patent is extended or adjusted under 35 U.S.C. 154(b) by 394 days.

(21) Appl. No.: 11/930,807

(22) Filed: Oct. 31, 2007

(65) Prior Publication Data
US 2009/0113141 A1 Apr. 30, 2009

(51) Int. Cl.
G06F 12/00 (2006.01)
G06F 12/14 (2006.01)

(52) U.S. Cl. .............. 711/152; 711/147; 711/148; 711/163; 711/209

(58) Field of Classification Search ............ 711/148, 711/152, 163, 209
See application file for complete search history.

(56) References Cited

U.S. PATENT DOCUMENTS

| | | | |
|---|---|---|---|
| 4,298,934 A * | 11/1981 | Fischer ................ | 711/152 |
| 5,848,435 A * | 12/1998 | Brant et al. ............ | 711/152 |
| 6,449,699 B2 * | 9/2002 | Franke et al. .......... | 711/147 |
| 6,510,496 B1 * | 1/2003 | Tarui et al. ............ | 711/147 |
| 6,557,084 B2 * | 4/2003 | Freerksen et al. ...... | 711/147 |
| 7,185,341 B2 * | 2/2007 | Van Hensbergen ...... | 719/312 |

* cited by examiner

*Primary Examiner*—Jack A Lane
(74) *Attorney, Agent, or Firm*—Mendelsohn, Drucker & Associates, P.C.; Edward J. Meisarosh; Steve Mendelsohn

(57) ABSTRACT

A shared memory controller is provided for controlling access to a shared memory by a plurality of processors. At least one device includes a storage area for storing a respective address range for each of a plurality of memory regions. The at least one device further includes a permission table containing, for each of the plurality of memory regions, read and write permission data for each of the plurality of processors. A memory fault detector is coupled to the at least one device and has an input for receiving a memory access request including a memory address, a processor identification and a read/write indicator. The memory fault detector includes logic for determining whether a memory access according to the memory access request would conflict with the read and write permission data in the permission table.

20 Claims, 3 Drawing Sheets

MEMORY PROTECTION SYSTEM AND METHOD

FIELD OF THE INVENTION

The present disclosure relates to protection for a shared memory accessible by multiple processors.

BACKGROUND

Multiprocessor integrated circuits (ICs) (ICs with two or more processors) typically share a common external memory bus and use common memory to save cost. These processors can inadvertently modify memory used by each other, causing system crashes.

Single processors can have memory protection units, using address segments, page tables, and/or access protection levels (Intel x86 MMU is a good example). In a typical configuration, a respective MMU is interposed between each processor and the internal memory bus. Some other implementations, (example: Agere x125) use a security block for secure boot loading, which is a static range check.

Memory protection units, such as the MMU, are complicated and require extensive software support, usually involving a large and complicated operating system. These only protect for accesses by a single processor and do not prevent accesses by the other processor. So, for example, a system having three processors would require three separate MMUs. There is no easy way to coordinate the memory protection regions between processors, especially when each processor is running its own, sometimes different, operating system, frequently authored by different suppliers.

SUMMARY OF THE INVENTION

In some embodiments, a shared memory controller is provided for controlling access to a shared memory by a plurality of processors. At least one device includes a storage area for storing a respective address range for each of a plurality of memory regions. The at least one device further includes a permission table containing, for each of the plurality of memory regions, read and write permission data for each of the plurality of processors. A memory fault detector is coupled to the at least one device and has an input for receiving a memory access request including a memory address, a processor identification and a read/write indicator. The memory fault detector includes logic for determining whether a memory access according to the memory access request would conflict with the read and write permission data in the permission table.

DETAILED DESCRIPTION

This description of the exemplary embodiments is intended to be read in connection with the accompanying drawings, which are to be considered part of the entire written description.

Embodiments are described herein to provide a hardware interlock which prevents accidental memory corruption, and provides a mechanism for protecting memory areas from accidental corruption, while allowing access for authorized software. It can also protect DMA controller accesses to shared memory regions.

This approach can protect memory regions dynamically under software control by trusted routines. User code would not use the trusted routines and could be prevented from reading or modifying memory regions. In some embodiments, the trusted routines control the memory access permissions for each processor that uses the shared memory by storing the permissions in a table.

Figure 1:
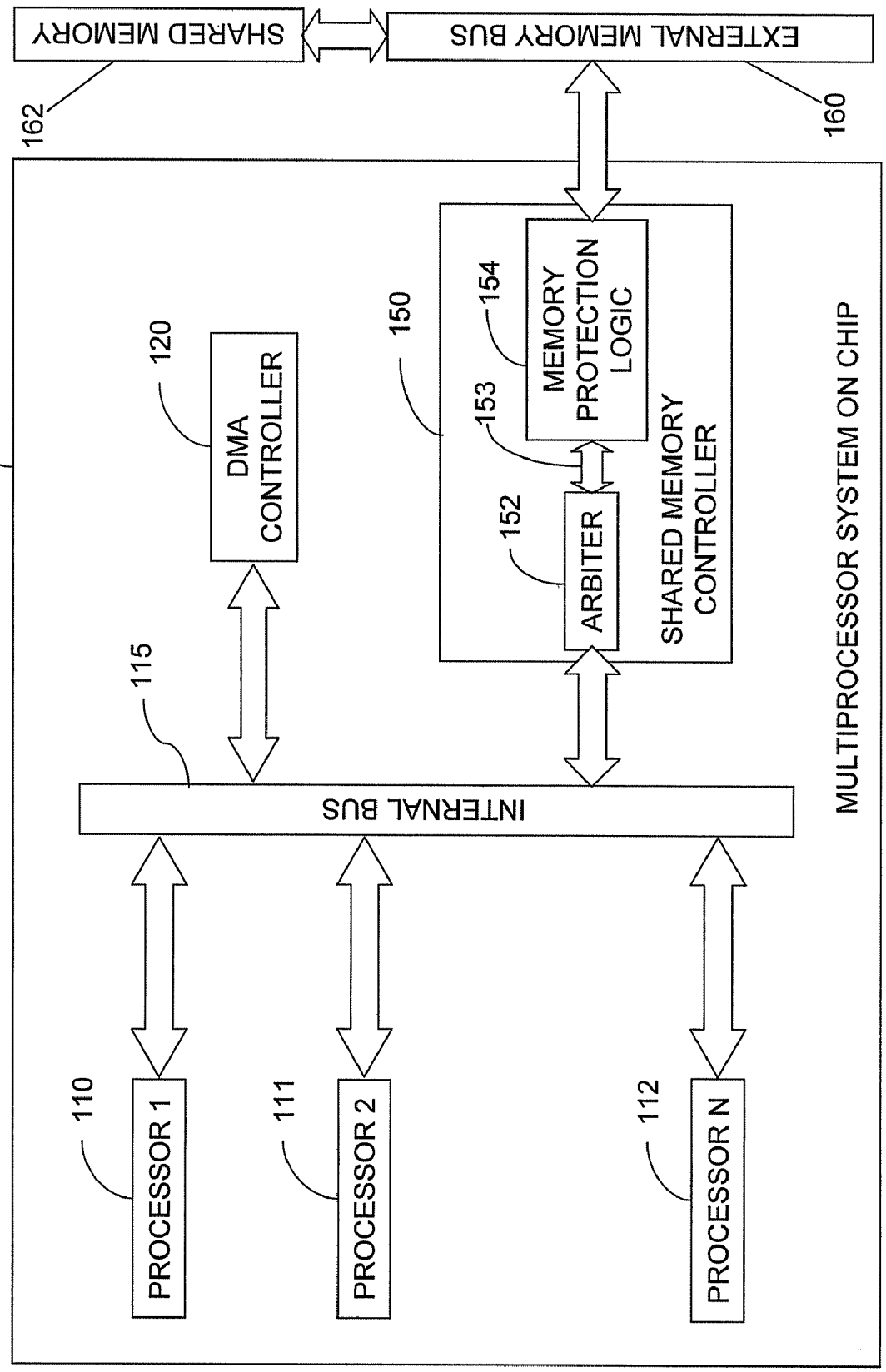
FIG. 1 is a block diagram of a system including a plurality of processors and a shared memory controller.

FIG. 1 shows an integrated circuit system 100 including an exemplary shared memory controller 150. In some embodiments, system 100 is a system on a chip (SOC). In other embodiments, system 100 includes a plurality of ICs mounted on a printed circuit board (PCB) or other suitable substrate. In other embodiments, the components shown in FIG. 1 are provided on a plurality of substrates, and are coupled via conductive or wireless couplings.

System 100 has two or more processors 110, 111 and 112. Although the example of FIG. 1 has three processors, system 100 may have any number of processors. The method of extending the architecture to other numbers of processors is described below in the discussion of FIG. 2.

In some embodiments, the plurality of processors 110-112 include at least two different types of processors. For example, in one embodiment, a first one of the plurality of processors 110 is an embedded ARM7 microprocessor core by ARM Holdings, plc, Cambridge, UK, a second one of the processors 111 is an ARM926EJ-S, and a third one of the plurality of processors is an application specific integrated circuit (ASIC). This is an optional feature. The inclusion of the shared memory controller 150 facilitates the inclusion of different types of processors and/or different operating systems, but does not require either. The exemplary chipset architecture has a shared external memory bus controller (not shown) to reduce pin count for cost and power.

In some embodiments, the at least two different types of processors 110-112 execute respectively different operating systems. In one example, processor 110 is an ARM7, processor 111 is an ARM 926, and processor N is a digital signal processor (DSP) implemented in ASIC. In this example, a Global System for Mobile (GSM) protocol stack resides on the ARM7 processor 110 and Agere middleware (by Agere Systems, Inc. of Allentown, Pa.) and applications run on the ARM926 processor 111. The DSP 112 runs its own operating system. All processors 110-112 can access and modify the shared memory space 162. The shared memory controller 150 is useful to prevent a customer's application program from corrupting the program stack and heap of the ARM7 and DSP and causing a software/hardware reboot. The likelihood of a corruption problem would otherwise be higher in configurations having different processors 110-112 and operating systems.

Shared memory protection logic 154 is implemented in a shared memory controller 150 and is not needed in each individual processor 110-112. Each processor 110-112 uses the same address pins to access the shared memory bus 160. As each processor 110-112 accesses memory through shared memory controller 150, the addresses are compared with programmed protected area addresses and addressing mode (read or write) permissions. Unintentional accesses (e.g., accesses by a processor to a memory region to which that processor is not allowed access by the pre-determined permissions) are blocked.

The shared memory controller 150 controls access to a shared memory 162 by the plurality of processors 110-112. In some embodiments, shared memory controller 150 is connected to processors 110-112 by a shared internal address and data bus 115. Bus request and acknowledgement control lines 153 are provided, and are schematically represented by a single arrow in FIG. 1.

The shared memory controller 150 includes an arbiter 152 and memory protection logic 154. An arbiter is an electronic device used in asynchronous circuits to order computational activities for shared resources. Arbiter 152 prevents two operations initiated by two of the processors 110-112 from occurring at once when they should not. It is possible for requests from two unsynchronized processors 110-112 to come in at nearly the same time. "Nearly" can be very close in time. Given only one request by one of the processors 110-112, Arbiter 152 promptly permits the corresponding action, delaying any second request until the first action is completed. If, however, two requests are received at substantially the same time, arbiter 152 then decides which request to service first, and passes that request to the memory protection logic 154.

Figure 2:
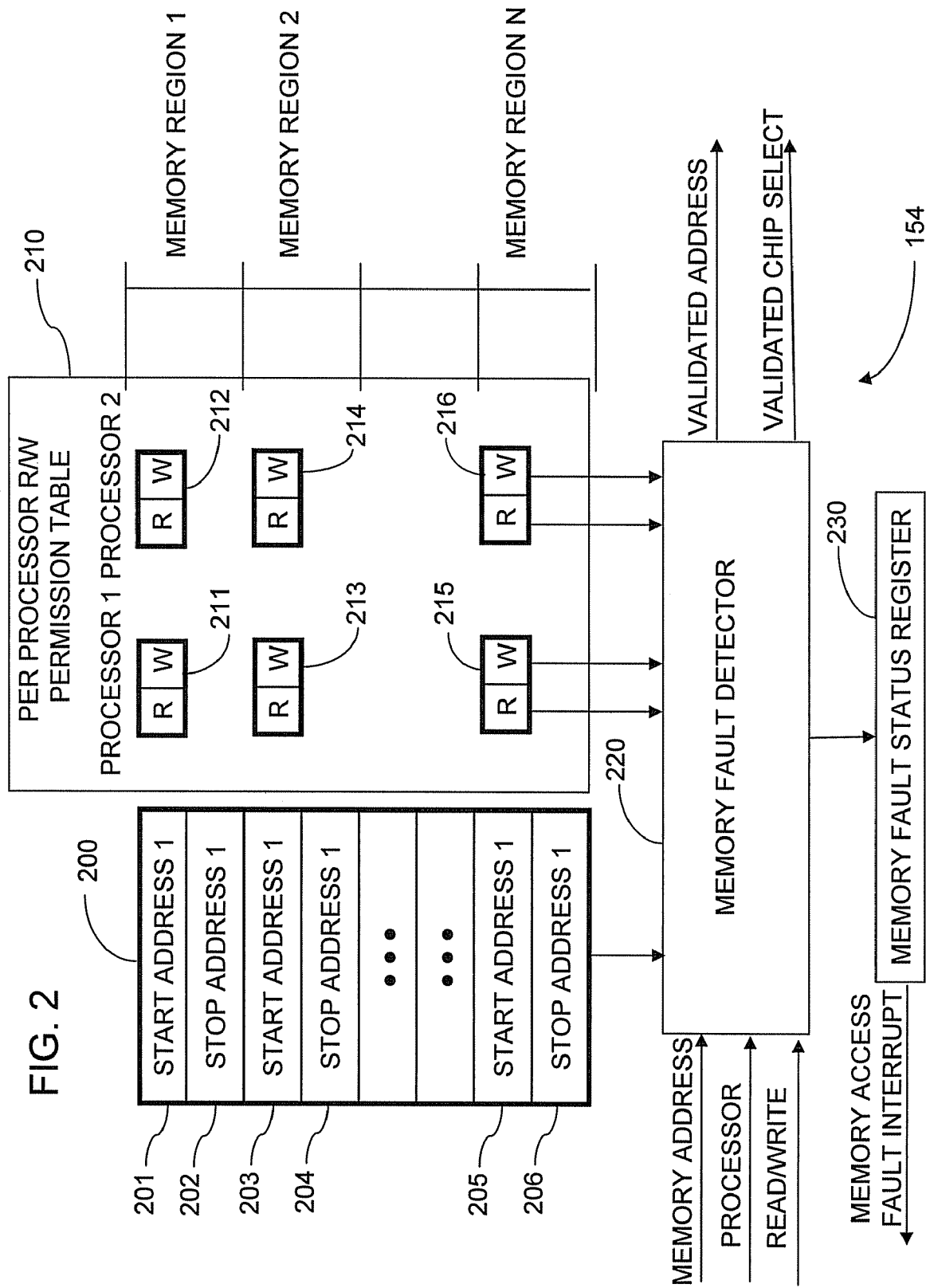
FIG. 2 is a block diagram of the memory protection logic of FIG. 1.

FIG. 2 shows one embodiment of the memory protection logic 154 of shared memory controller 150. Memory protection logic 154 includes at least one device comprising a storage area 200 for storing a respective address range for each of a plurality of memory regions and a storage area 210 for storing corresponding permission data for each address range.

As mentioned above, trusted routines are permitted to access the address ranges in storage area 200 and the permission data in storage area 210 dynamically, and other processes and applications are not permitted to access the address ranges or permission data. In some embodiments, the trusted routines can add and/or delete the range data and permission data corresponding to a processor. In some embodiments, the trusted routines can dynamically change the ranges for existing data in the storage areas 200, 210. In some embodiments, the trusted routines can dynamically change the read and write permissions for existing data in storage areas 200 and 210. In other embodiments, the trusted routines can dynamically perform any or all of these changes to the range and/or permission data.

The storage areas 200 and 210 can be one or more registers, a plurality of storage cells implemented in application specific integrated circuitry (ASIC), or other storage suitable for storing addresses and associated permission data.

In the example of FIG. 2, the storage area 200 contains a plurality of pairs of entries (201 and 202, 203 and 204, 205 and 206). Each pair of entries (e.g., 201, 202) defines an address range within the shared memory. Any desired number of pairs may be provided, corresponding to a number of memory portions for which separate read and write permission control is desired. The number of memory regions does not have to match the number of processors. In some embodiments there is a one-to-one correspondence between the number of processors and number of memory regions. In other embodiments, there may be more than one memory region for a given processor.

The storage device (or devices) in shared memory controller 154 further comprises a permission table 210 containing, for each of the plurality of memory regions 1-N, read and write permission data 211-216 for each of the plurality of processors 110-112. The read and write permission data 211-216 for a given processor determine whether that processor is permitted to read or write, respectively, from or to the region of memory to which those read and write permission data correspond. In the example of FIG. 2, the table includes two columns corresponding to processors 110 and 111. Additional columns (not shown) can contain corresponding read and write permission data for additional processors, such as $N^{th}$ processor 112. Each additional column would include a respective pair of read and write permission data for each respective memory region. The read and write data 211-216 may each comprise two bits per processor per memory region (one bit for read permission and one bit for write permission) or any integer number times two bits per processor per memory region. For example, in a configuration with three processors and three memory regions, the permission data would include an integer multiple of 18 bits.

FIG. 2 shows an exemplary memory protection logic 154 for a two-processor system. This architecture is readily extended to configurations having three or more processors. Each memory region is defined by a range (e.g., a start and stop address), and read(R) and write (W) access. R/W access is further segmented by processor. In FIG. 2 there are R/W permission bits for processor 1 and processor 2. If an incoming memory request (from any processor 110-112 or DMA controller 120), is within the address range of any of the defined memory regions, the R/W permission bits are examined for the accessing processor, and if the access type is allowed by that processor, then the address is validated (i.e., passed through to the actual external memory bus 160). If the requested action is not allowed, then the address is not allowed onto the memory bus 160 and a memory fault signal is generated and transmitted back to the processor 110-112 or other fault indication system.

A memory fault detector 220 is coupled to the address table 200 and permission table 210 of the storage device, and has an input for receiving a memory access request by way of the arbiter 152. The memory access request includes a memory address, a processor identification and a read/write indicator. The memory fault detector 220 includes logic for determining whether a memory access according to the memory access request would conflict with the read and write permission data 211-216 in the permission table 210. An example of pseudocode for the logic is below.

```
M = processor number;
N = region count;
for(i = 1; i ≤ N; i + +){
    if ( Address_{i start} ≤ Address_{request} ≤ Address_{i stop} ){
        if(M_{read_request} ≠ M_{read_permission} ){
            MEMORY_FAULT = TRUE;
            return;
        }
        if(M_{write request} ≠ M_{write_permission} ){
            MEMORY_FAULT = TRUE;
            return;
        }
        MEMORY_FAULT = FALSE;
        return;
    }
}
```

In some embodiments, memory fault detector 220 is implemented in application specific integrated circuitry (ASIC). In some embodiments, the ASIC is designed manually. In some embodiments, a machine readable storage medium is encoded with pseudocode, such that, when the pseudocode is processed by a processor, the processor generates GDSII data for fabricating an application specific integrated circuit that performs a method. An example of a suitable software program suitable for generating the GDSII data is "ASTRO" by Synopsys, Inc. of Mountain View, Calif.

The memory fault detector 220 has an output for outputting a validated address and a chip select signal, if the memory access according to the memory access request is allowed based on the address range containing the memory address and the read and write permission data in the permission table 210 corresponding to the address range containing the memory address. That is, the validated address and chip select signal are output, if the memory access according to the memory access request would not conflict with the read and write permission data in the permission table 210. The output includes an address terminal and a chip select terminal adapted to be connected to a memory bus 160 in communication with the shared memory 162.

If one of the processors 110-112 attempts to write to or read from a portion of the shared memory 162 for which that processor's permission data do not allow entry, memory fault detector 220 outputs a memory fault signal. Memory fault detector 220 has an output for providing the memory fault signal to a memory fault status register 230. Memory fault status register 230 receives an identification of the one of the plurality of processors 110-112, from which the memory access request is received, and for generating a memory access fault interrupt signal.

Figure 3:
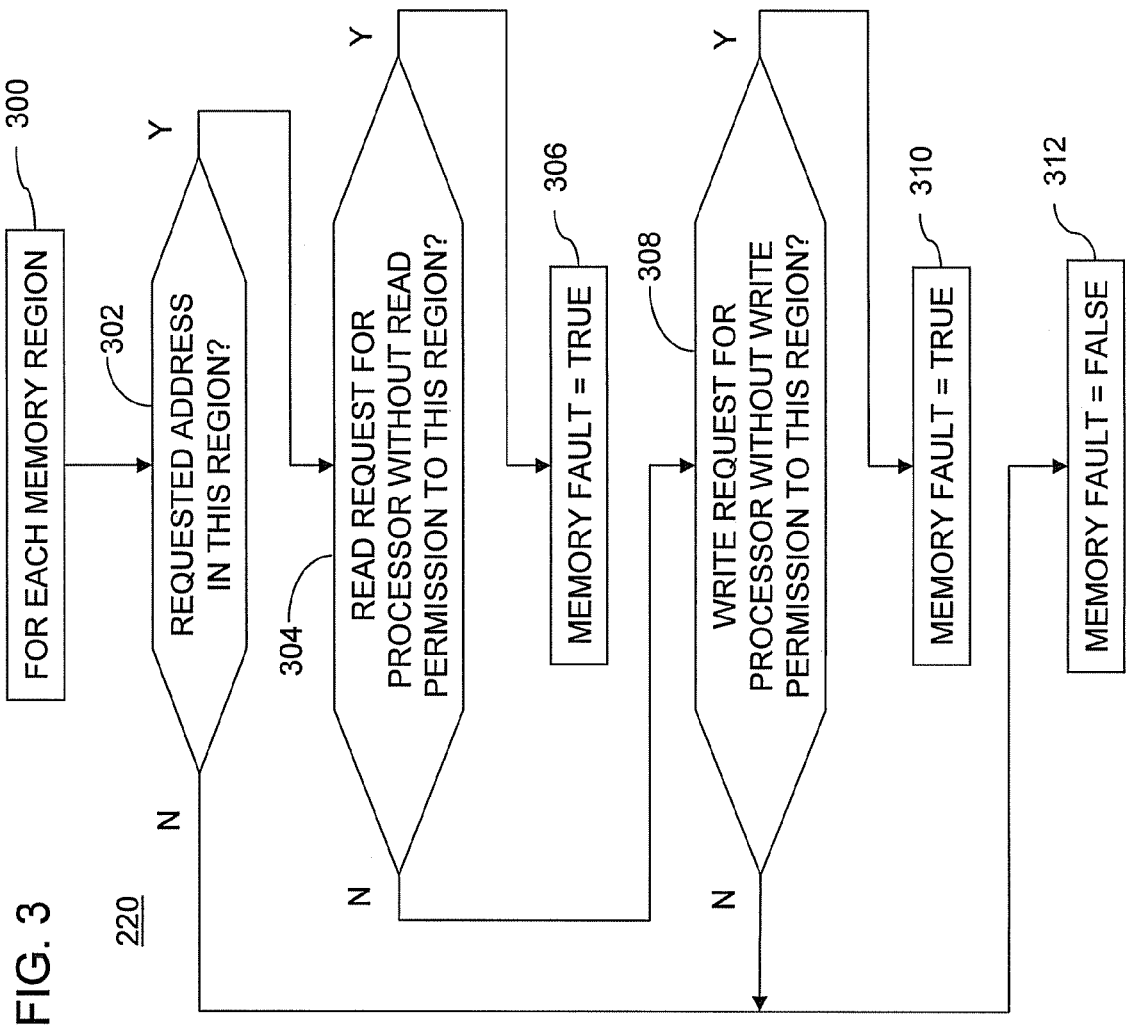
FIG. 3 is a flow chart of the process performed by the memory fault detector of FIG. 2.

FIG. 3 is a flow chart of an exemplary process performed by memory fault detector 220.

At step 300, a loop is repeated for each memory region.

At step 302, a determination is made whether a requested address corresponds to this region. If the requested address is within this region, step 304 is executed. Otherwise, step 312 is executed.

At step 304, a determination is made whether this is a read request by a processor for which the corresponding read permission datum does not allow a read operation. If this is a request by a processor that does not have permission, step 306 is performed. Otherwise, step 308 is performed.

At step 306, the state of the memory fault signal is set to a value corresponding to logical .TRUE. This value is then output to memory fault status register 230.

At step 308, a determination is made whether this is a write request by a processor for which the corresponding write permission datum does not allow a write operation. If this is a request by a processor that does not have permission, step 310 is performed. Otherwise, step 312 is performed.

At step 310, the state of the memory fault signal is set to a value corresponding to logical .TRUE. This value is then output to memory fault status register 230.

At step 312, the state of the memory fault signal is set to a value corresponding to logical .FALSE. This value is then output to memory fault status register 230.

Referring again to FIG. 2, memory fault status register 230 has an output for providing the memory access fault interrupt signal to one of the plurality of processors 110-112, from which the memory access request is received, if the memory access according to the memory access request would conflict with the read and write permission data in the permission table 210.

In some embodiments, system 100 further includes a direct memory access (DMA) controller 120, and the shared memory controller 150 is capable of controlling access to the shared memory 162 by the DMA controller 120. For example, DMA controller 120 may be allowed access to one or more specific regions of the memory 162, and the permissions for DMA controller 120 may be specified in the permission table 210, in the same manner as each of the processors 110-112. Accesses to memory 162 by DMA controller 120 would then be validated by comparing a memory address requested by DMA controller 120 to the permission data for DMA controller 120 (in the permission table 210) corresponding to the memory region containing the requested address.

A system as described in the above example provides multiprocessor memory protection without requiring software coordination or communications between the processors 110-112. The shared memory controller 154 handles all memory accessing subsystems including DMA controllers 120.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An integrated circuit system, comprising:
    a plurality of processors;
    a shared memory controller for controlling access to a shared memory by the plurality of processors, including:
        at least one device comprising a storage area for storing a respective address range for each of a plurality of memory regions;
        said at least one device further comprising a permission table containing, for each of the plurality of memory regions, read and write permission data for each of the plurality of processors;
        a memory fault detector coupled to the at least one device and having an input for receiving a memory access request including a memory address, a processor identification and a read/write indicator, said memory fault detector including logic for determining whether a memory access according to the memory access request would conflict with the read and write permission data in the permission table.

2. The shared memory controller of claim 1, wherein the memory fault detector has an output for outputting a validated address and a chip select signal, if the memory access according to the memory access request is allowed based on the address range containing the memory address and the read and write permission data in the permission table corresponding to the address range containing the memory address.

3. The shared memory controller of claim 2, wherein the output includes an address terminal and a chip select terminal adapted to be connected to a memory bus in communication with the shared memory.

4. The shared memory controller of claim 1, further comprising an output for providing a memory access fault interrupt signal to one of the plurality of processors, from which the memory access request is received, if the memory access according to the memory access request would conflict with the read and write permission data in the permission table.

5. The shared memory controller of claim 4, further comprising a memory fault status register for receiving an identification of the one of plurality of processors, from which the memory access request is received, and for generating the memory access fault interrupt signal.

6. The integrated circuit system of claim 1, wherein the plurality of processors include at least two different types of processors.

7. The integrated circuit system of claim 6, wherein one of the plurality of processors is an embedded microprocessor, and another of the plurality of processors is an application specific integrated circuit.

8. The integrated circuit system of claim 7, wherein the at least two different types of processors execute respectively different operating systems.

9. The integrated circuit system of claim 1, wherein the system is a system on a chip.

10. The integrated circuit system of claim 1, further comprising a direct memory access (DMA) controller, wherein the shared memory controller is capable of controlling access to the shared memory by the DMA controller.

11. A shared memory controller for controlling access to a shared memory by a plurality of processors, comprising
   at least one device comprising a storage area for storing a respective address range for each of a plurality of memory regions;
   said at least one device further comprising a permission table containing, for each of the plurality of memory regions, read and write permission data for each of the plurality of processors;
   a memory fault detector coupled to the at least one device and having an input for receiving a memory access request including a memory address, a processor identification and a read/write indicator, said memory fault detector including logic for determining whether a memory access according to the memory access request would conflict with the read and write permission data in the permission table.

12. The shared memory controller of claim 11, wherein the memory fault detector has an output for outputting a validated address and a chip select signal, if the memory access according to the memory access request would not conflict with the read and write permission data in the permission table.

13. The shared memory controller of claim 11, further comprising an output for providing a memory access fault interrupt signal to one of the plurality of processors, if the memory access by that one of the plurality of processors according to the memory access request would conflict with the read and write permission data in the permission table.

14. The shared memory controller of claim 13, further comprising a memory fault status register for receiving an identification of the one of plurality of processors, from which the memory access request is received, and for generating the memory access fault interrupt signal.

15. A method for controlling memory access to a shared memory by a plurality of processors, comprising
   storing a respective address range for each of a plurality of memory regions in a storage area of at least one device;
   storing in a permission table of the at least one device, read and write permission data for each of the plurality of memory regions, and for each of the plurality of processors;
   receiving a memory access request including a memory address, a processor identification and a read/write indicator,
   determining which of the memory regions would be accessed by a memory access according to the memory access request; and
   allowing or denying the memory access, based on the read and write permission data in the permission table corresponding to the determined memory region.

16. The method of claim 15, further comprising providing a memory access fault interrupt signal to one of the plurality of processors, from which the memory access request is received, if the memory access according to the memory access request would conflict with the read and write permission data in the permission table.

17. The method of claim 16, wherein the storing steps and the receiving, determining, and interrupt signal providing steps are performed by devices in a system on a chip.

18. The method of claim 15, further comprising outputting a validated address and a chip select signal, if the memory access according to the memory access request would not conflict with the read and write permission data in the permission table.

19. The method of claim 15, wherein at least one of the storing steps is performed by a trusted software routine.

20. The method of claim 15, wherein the memory access is executed by a direct memory access controller.

* * * * *